United States Patent
Menassa et al.

(10) Patent No.: US 9,583,246 B2
(45) Date of Patent: Feb. 28, 2017

(54) TEMPORARY ATTACHMENT AND ALIGNMENT OF LIGHT-WEIGHT COMPONENTS USING SPATIALLY MODULATED MAGNETIC FIELDS TECHNOLOGY

(75) Inventors: Roland J. Menassa, Macomb, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1003 days.

(21) Appl. No.: 13/568,312

(22) Filed: Aug. 7, 2012

(65) Prior Publication Data
US 2014/0044972 A1    Feb. 13, 2014

(51) Int. Cl.
*H01F 7/02* (2006.01)
*F16B 1/00* (2006.01)

(52) U.S. Cl.
CPC ......... *H01F 7/0273* (2013.01); *H01F 7/0247* (2013.01); *H01F 7/0252* (2013.01); *F16B 2001/0035* (2013.01); *Y10T 29/49778* (2015.01); *Y10T 156/10* (2015.01); *Y10T 428/31515* (2015.04)

(58) Field of Classification Search
CPC ................ H01F 7/0247; H01F 7/0252; F16B 2001/0035
USPC .................................................. 335/285, 306
See application file for complete search history.

(56) References Cited

U.S. PATENT DOCUMENTS

| | | | |
|---|---|---|---|
| 7,681,256 B2 | 3/2010 | Fullerton et al. | |
| 7,746,205 B2 | 6/2010 | Fullerton et al. | |
| 2009/0273422 A1 | 11/2009 | Fullerton et al. | |
| 2011/0018660 A1 | 1/2011 | Fullerton et al. | |
| 2011/0031839 A1* | 2/2011 | Fullerton | G01D 18/00 310/152 |
| 2012/0032765 A1 | 2/2012 | Bilbrey et al. | |
| 2012/0092103 A1* | 4/2012 | Roberts | H01F 7/0284 335/295 |

OTHER PUBLICATIONS

Office Action for U.S. Appl. No. 13/451,836 Dated Oct. 2, 2014.
Office Action for U.S. Appl. No. 13/451,836 Dated Apr. 24, 2015.
Office Action for U.S. Appl. No. 15/009,766 Dated Mar. 24, 2016.

* cited by examiner

*Primary Examiner* — Ramon M Barrera
(74) *Attorney, Agent, or Firm* — Quinn Law Group

(57) ABSTRACT

Fixtureless self-alignment and orientation of components during an assembly process, and self-aligning/self-orienting components for assembly. Self-alignment and self-orientation are provided by integrating complementary spatially-modulated magnetic arrays into components requiring alignment and/or orientation during an assembly process. In addition to providing self-alignment/self-orientation, the spatially-modulated magnetic arrays also provide selective component placement and/or assembly order. Final assembly can involve permanent mechanical or adhesive fasteners.

9 Claims, 3 Drawing Sheets

TEMPORARY ATTACHMENT AND ALIGNMENT OF LIGHT-WEIGHT COMPONENTS USING SPATIALLY MODULATED MAGNETIC FIELDS TECHNOLOGY

BACKGROUND

Manufacturing of complex small mechanical sub-assemblies often requires special tooling and/or intensive hand labor for putting together the assembly's components. These and similar factors can increase the cost of manufacturing as well as the setup time necessary to go into production. There is thus a need for an efficient, versatile, and low-cost method of placing and maintaining the alignment of small components in specific predetermined positions and specific orders that reduces or eliminates the need for special alignment fixtures and skilled manual labor. This goal is met by the present invention.

SUMMARY

According to embodiments of the invention, spatially-modulated magnetic arrays are used to effect selective alignments of component parts, and hold the parts in the desired alignment pending permanent fastening during the assembly process.

Spatially modulated magnetic arrays feature an arrangement of magnetic regions with different polarity (e.g. south or north) and magnetic field strength that result in a spatially non-uniform, multi-pole magnetic field that can exhibit a variety of behaviors that are not seen in the common magnetic dipole interactions. As a non-limiting example, unlike in simple magnetic dipoles where the interaction is limited to attraction between opposite poles and repulsion between like poles, the interaction between spatially modulated magnetic arrays can be attractive at large separations but repulsive at small separations. In the context of embodiments of the invention, "higher-order" magnetic arrays are magnetic arrays whose multipole moment is greater than second order (higher than a magnetic dipole). A spatially modulated magnetic array may also be custom-configured with a special spatially modulated pattern of magnetic regions to have a particularly strong magnetic interaction when brought into magnetic proximity with another array that has been custom-configured to be complementary to the same pattern. The strong magnetic interaction not only can attract the spatially modulated arrays toward one another, but can also align them to particular positions and angles, according to the specific pattern. Such complementary patterns are denoted herein as having a "higher-order mutual magnetic correspondence", a term which emphasizes that the magnetic field is of higher multipole order than an ordinary magnetic dipole field.

Embodiments of the invention provide spatially-modulated magnetic arrays that establish a temporary alignment of one component to another, such that the components are properly matched and aligned for a permanent holding that is brought into effect during the assembly process.

According to embodiments of the invention, the terms "align", "aligning", and "alignment" regarding two or more components denotes that the components are placed and maintained in a position and/or orientation relative to one another at some time during an assembly process of the components, and that the alignment is achieved by means other than being held exclusively by other components of the assembly. In addition to using the hands to align components, tools and fixtures as well as adhesives such as tape are also typically used.

According to embodiments of the invention, the terms "assembly", "sub-assembly", and the like denote a collection of separate pre-existing components which are brought together and held together, and which includes at least one attachment by permanent material fastening means. It is noted that these terms do not cover collections of non-pre-existing components which are brought into existence by a process that creates the components in a state of being held together as part of the process, e.g., objects produced by so-called "3D printing" processes; ablated or sculpted objects, such as Chinese ornamental carved ivory concentric spheres, and the like—these are not considered "assemblies" for purposes of this disclosure, because the component parts are not pre-existing.

According to embodiments of the invention, the terms "hold", "holding", "held", and the like denote that a component is maintained in position and/or orientation relative to an assembly and/or to a component thereof by one or more other components of the assembly. A component that is held to another component is not necessarily attached to the other component, but may be indirectly kept in position and/or orientation by the other component and possibly one or more additional components. Non-limiting examples of held components that are not attached include:

captive nut, captive screw, etc.;
  a retractable ball pen comprising a barrel attached to a screw-on clip-top (attached by threaded material fastening means), with a refill and spring held inside (the refill and spring are held but are not attached); and
  a screw going through a hole in a metal plate and threaded into a nut on the other side of the plate. The screw is held to the plate, but not attached to the plate. The screw is attached to the nut, and vice versa; the screw is held to the plate by the nut, and the nut is held to the plate by the screw.
  It is noted that certain elements of an assembly may be construed either as components that attach to other components, or alternatively as fastening means. For example, a screw that joins two components could be construed as a component itself, in which case it "holds" other components together. Alternatively, the same screw could be construed as a fastening means, in which case it "attaches" components together.

According to embodiments of the invention, the terms "attach", "attachment", and the like denote that a component is directly and integrally joined to one or more other components through a permanent material fastening means. Attachment is a kind of holding (see above) by which two or more components are directly and integrally joined.

Non-limiting examples of permanent material fastening means include:
  threaded fasteners (screws, nuts, bolts, setscrews, etc.);
  spring fasteners (e.g., snap-rings, spring latches, etc.);
  adhesives (e.g., glue, epoxy, solvents, tape);
  welds, solder-joints, heat-seal, etc.;
  press-fittings;
  expansion and shrink fittings;
  deformations, crimping, shaping, etc.;
  thermal deformation, expansion, and shrink fittings;
  friction fasteners (e.g., nails, staples, etc.);
  deformation fasteners (e.g., cotter pins, twisted wire); and
  combinations thereof.

According to embodiments of the invention, magnetic fields are not considered to be a material fastening means.

According to embodiments of the invention, assembly of separate pre-existing components requires at least one attachment in order for all components to be held together in the completed assembly.

According to embodiments of the invention, in the context of holding components together, the terms "permanent", "permanently", and the like connote a finite time period corresponding to the expected lifetime of the assembly, or between maintenance or repair events thereof That is, in embodiments of the invention, "permanent" simply means "not temporary". A "permanent" holding is maintained during the normal course of using the assembly. Thus, these terms do not imply irreversibility of holding. In some embodiments of the invention, it is possible to reversibly free a first component from a second component without altering the holding properties of the material fastening means. Non-limiting examples include screw fasteners and spring fasteners, which may be used to provide permanent holding, but are also typically reversible. Irreversible permanent fastening means include welding or other melting processes, deformation, adhesives, etc., which cannot be disassembled without substantially altering the holding properties of the material fastening means.

According to certain embodiments of the invention, a spatially-modulated magnetic array is "integrated" into a component, thereby providing the component with a spatially-modulated magnetic field. For components made of a suitable magnetic material (e.g., a ferromagnetic material), the spatially-modulated magnetic array can be part of the original component. In components made of non-magnetic materials (e.g., plastic), the spatially-modulated magnetic array can be held to the component by a material fastening means.

Therefore, according to certain embodiments of the invention, there is provided a method for aligning a first component relative to a second component in an assembly process, the method including: integrating a first spatially-modulated magnetic array into the first component; integrating a second spatially-modulated magnetic array into the second component, wherein the second spatially-modulated magnetic array is complementary to the first spatially-modulated magnetic array; placing the first spatially-modulated magnetic array in magnetic proximity to the second spatially-modulated magnetic array, such that the first spatially-modulated magnetic array and the second spatially-modulated magnetic array have a higher-order mutual magnetic correspondence, for providing an alignment of the first spatially-modulated magnetic array and the second spatially-modulated magnetic array relative to one another; and providing a permanent material fastening means operative to hold the first component and the second component relative to one another according to the alignment.

Also, according to additional embodiments of the invention, there is provided an assembly including a first component having integrated thereinto a first spatially-modulated magnetic array which is in magnetic proximity with a second spatially-modulated magnetic array complementary to the first spatially-modulated magnetic array, wherein the second spatially-modulated magnetic array is integrated into a second component which is attached to the first component by a permanent fastening means.

According to other embodiments of the invention, the permanent fastening means is a mechanical fastener.

According to further embodiments of the invention, the permanent fastening means is an adhesive.

BRIEF DESCRIPTION OF THE DRAWINGS

The subject matter disclosed may best be understood by reference to the following detailed description when read with the accompanying drawings in which.

Figure 1:
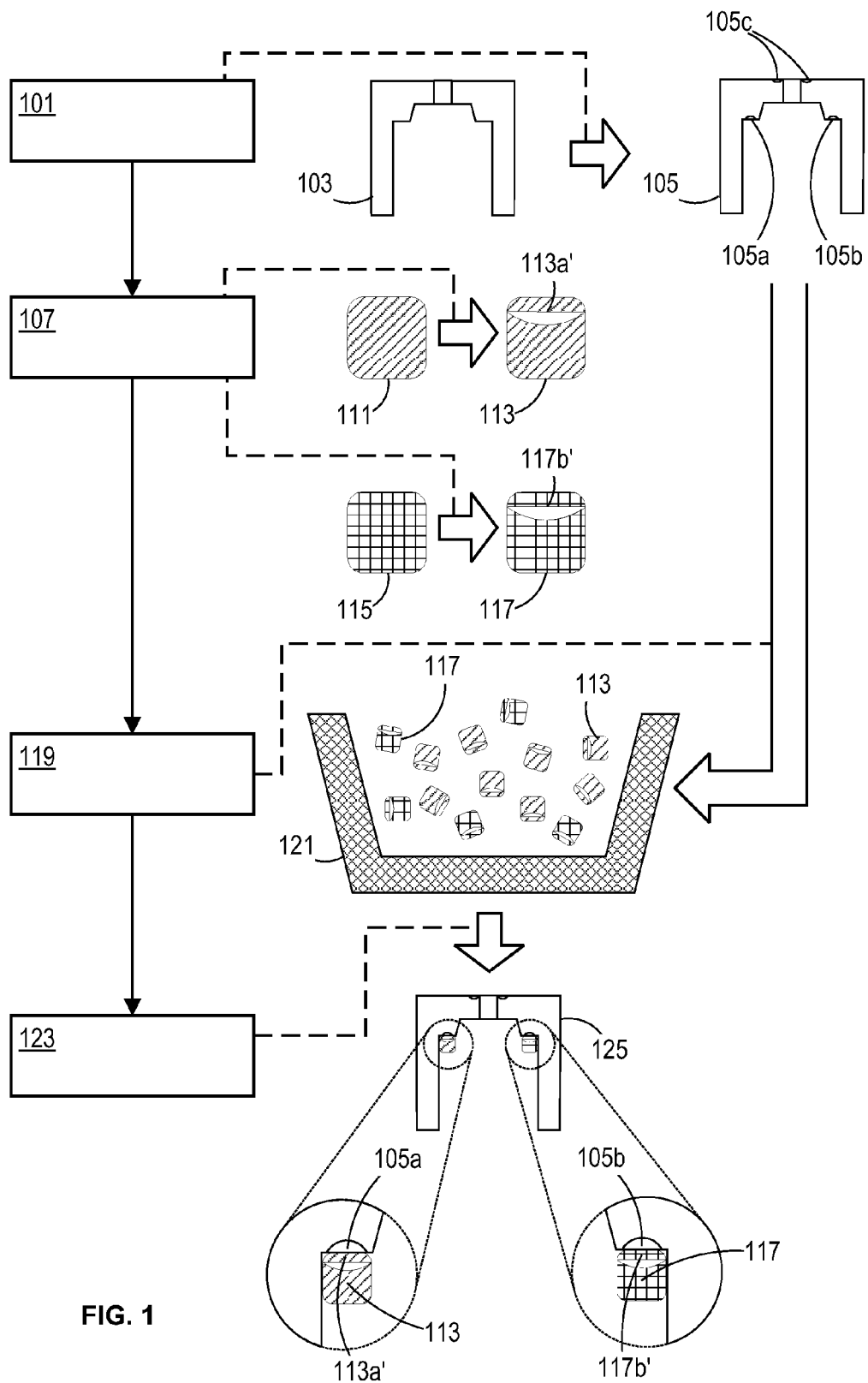
FIG. 1 illustrates a portion of a component assembly method according to an embodiment of the invention.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

FIG. 1 illustrates a portion of a component assembly method according to an embodiment of the invention. In a step 101 a base component 103 is provided with integrated spatially-modulated magnetic arrays, to result in a base component 105 having spatially-modulated magnetic arrays 105a, 105b, and 105c. In this embodiment, array 105a is different from array 105b and both are different from arrays 105c. The resulting spatially-modulated magnetic fields produced by spatially-modulated magnetic arrays 105a, 105b, and 105c have different patterns.

In a step 107 a component 111 is provided with an integrated spatially-modulated magnetic array 113a', to result in a component 113 having a spatially-modulated magnetic field that is complementary to that of spatially-modulated magnetic array 105a; and a component 115 is provided with an integrated spatially-modulated magnetic array 117b', to result in a component 117 having a spatially-modulated magnetic field that is complementary to that of spatially-modulated magnetic array 105b.

In a step 119, base component 105 is placed in a mix 121 of components 113 and 117, and entire mix 121 is stirred.

According to this embodiment of the invention, "stirring" denotes agitating the components in a mix by any of various means, including, but not limited to: mechanical agitation by a moving paddle or similar object(s); and vibration, shaking, and/or tumbling of the mix; with the result that the components move, reorient themselves relative to one another, and come into proximity with one another in a random fashion as the stirring proceeds. The objective of stirring is to ensure that each region of spatially-modulated magnetic field will have an opportunity to establish a higher-order mutual magnetic correspondence with a complementary region (provided, of course, that complementary regions are present in the mix).

According to embodiments of the invention, placing a first component in a mix of other components involves exposing the first component to the other components in any convenient manner In certain embodiments, a small component can be placed in a container holding the mix of other components. In other embodiments, a first component having a large inner space may be placed in a mix of other components by having the other components placed in the inner space of the first component.

In a step 123 a preassembly 125 is removed from mix 121. In embodiments of the invention, the term "preassembly" denotes any maintained alignment of components prior to final assembly of the components into a permanently assembled unit. Preassembly 125 has been formed by the alignment of parts 113 and 117 with base 105. In preassembly 125, component 113 is placed and maintained in alignment by spatially-modulated magnetic array 113a', which has established a higher-order mutual magnetic correspondence with complementary spatially-modulated magnetic array 105a of base component 105; and component 117 is placed and maintained in alignment by spatially-modulated magnetic array 117b', which has established a higher-order mutual magnetic correspondence with complementary spatially-modulated magnetic array 105b of base component 105.

According to embodiments of the invention, the above alignments result naturally from the higher-order mutual magnetic correspondence between complementary spatially-modulated magnetic fields, which establish strong near-field attraction between the aligned components in the desired relative position and/or orientation. Once the components have come into appropriate proximity, per the stirring operation as described above, the strong magnetic near-field attraction acts selectively to place, align, and orient the components as desired.

FIG. 1 illustrates another desirable property provided by various embodiments of the invention, namely selective component placement and orientation. As illustrated in FIG. 1, components 113 and 117 are placed in mix 121 in which they are indiscriminately intermixed. However, because of the selective nature of spatially-modulated magnetic arrays 105a and 105b, respectively, which have different patterns, components 113 and 117 are selectively positioned in preassembly 125 as shown, without any further intervention or attention.

According to embodiments of the invention, preassembly 125 maintains the desired alignment and orientation of the components during the assembly process, even if moved or inverted, provided that excessive shock and vibration are avoided, which might overcome the magnetic alignment of the respective components. According to embodiments of the invention, the term "preassembly" denotes a collection of components which are aligned and/or oriented by higher-order mutual magnetic correspondence between complementary spatially-modulated magnetic fields, but for which at least some components are not yet components are not yet held directly or indirectly by permanent fastening means.

According to additional embodiments of the invention, it is possible to specify the order in which the integrated spatially-modulated magnetic arrays of certain specified components come into magnetic proximity with complementary spatially-modulated magnetic arrays of certain other components. According to one such embodiment, the order of placing components into various mixes is specified for the desired order to be attained. According to another such embodiment, the composition of the various mixes is specified, and certain alignments of components of the mixes are attained prior to placing individual components in those mixes. In further embodiments of the invention, components are provided with combinations of integrated spatially-modulated magnetic arrays, such that two components must be aligned together before a third component will align with them, thereby imposing an order of assembly on the combination of all three.

Figure 2:
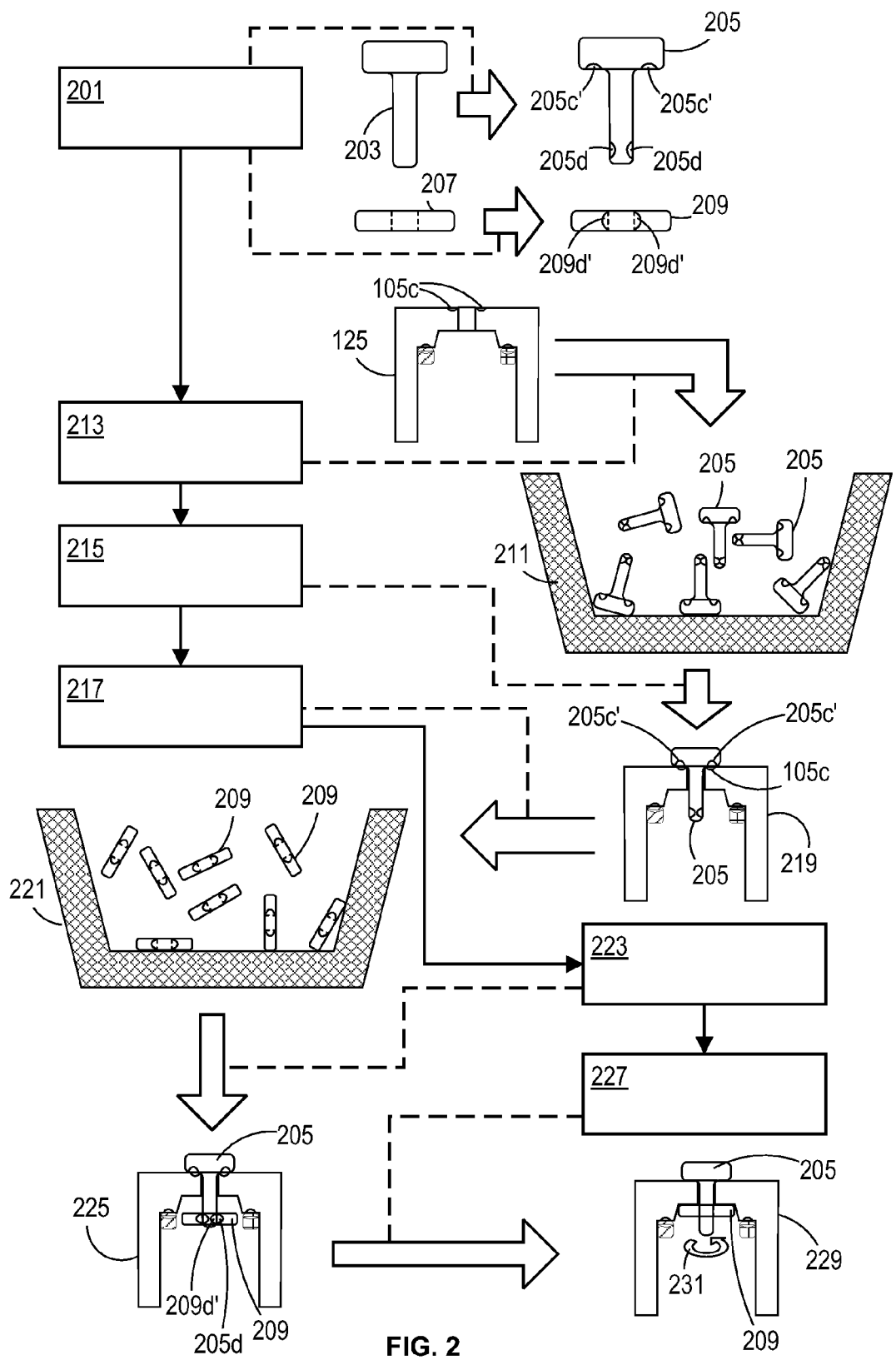
FIG. 2 illustrates a portion of a component assembly method according to a further embodiment of the invention.

FIG. 2 illustrates a portion of a component assembly method according to a further embodiment of the invention. In a step 201, a component shown in a non-limiting example of a threaded component 203 is provided with integrated spatially-modulated magnetic arrays, to result in a threaded component component 205 having spatially-modulated magnetic arrays 205c', which are complementary to arrays 105c; and also having integrated spatially-modulated magnetic arrays 205d. Additionally in step 201, a fastening component shown as a non-limiting example of a threaded fastener 207 is provided with integrated spatially-modulated magnetic arrays to result in a threaded fastener 209 having spatially-modulated magnetic arrays 209d', which are complementary to spatially-modulated magnetic arrays 205d of threaded component 205.

In a step 213 preassembly 125 is placed in a mix 211 of threaded components 205 and entire mix 211 is stirred in the manner as previously described.

In a step 215 a preassembly 219 is removed from mix 211. Preassembly 219 has been formed by the alignment of threaded component 205 with preassembly 125. In preassembly 219, threaded component 205 is placed and maintained in alignment by spatially-modulated magnetic arrays 205c', which have established higher-order mutual magnetic correspondences with complementary spatially-modulated magnetic arrays 105c of preassembly 125.

In a step 217 preassembly 219 is placed in a mix 221 of threaded fasteners 209 and entire mix 221 is stirred in the manner as previously described.

In a step 223 preassembly 225 is removed from mix 221. Preassembly 225 has been formed by the alignment of threaded fastener 209 with threaded component 205, which is placed and maintained in alignment by spatially modulated magnetic arrays 205d, which have established higher-order mutual magnetic correspondences with complementary spatially-modulated magnetic arrays 209d' of threaded fastener 209.

In a step 227 a preassembly 229 is formed from preassembly 225 by permanently fastening threaded fastener 209 onto threaded component 205 by a permanent fastening operation. In the non-limiting example of threaded fasteners, permanent fastening is accomplished by applying a suitable torque 231 to threaded fastener 209 relative to threaded component 205. In embodiments of the invention, permanent fastening such as torque 231 can be applied in any suitable manner, such as manually or via appropriate tools.

Figure 3:
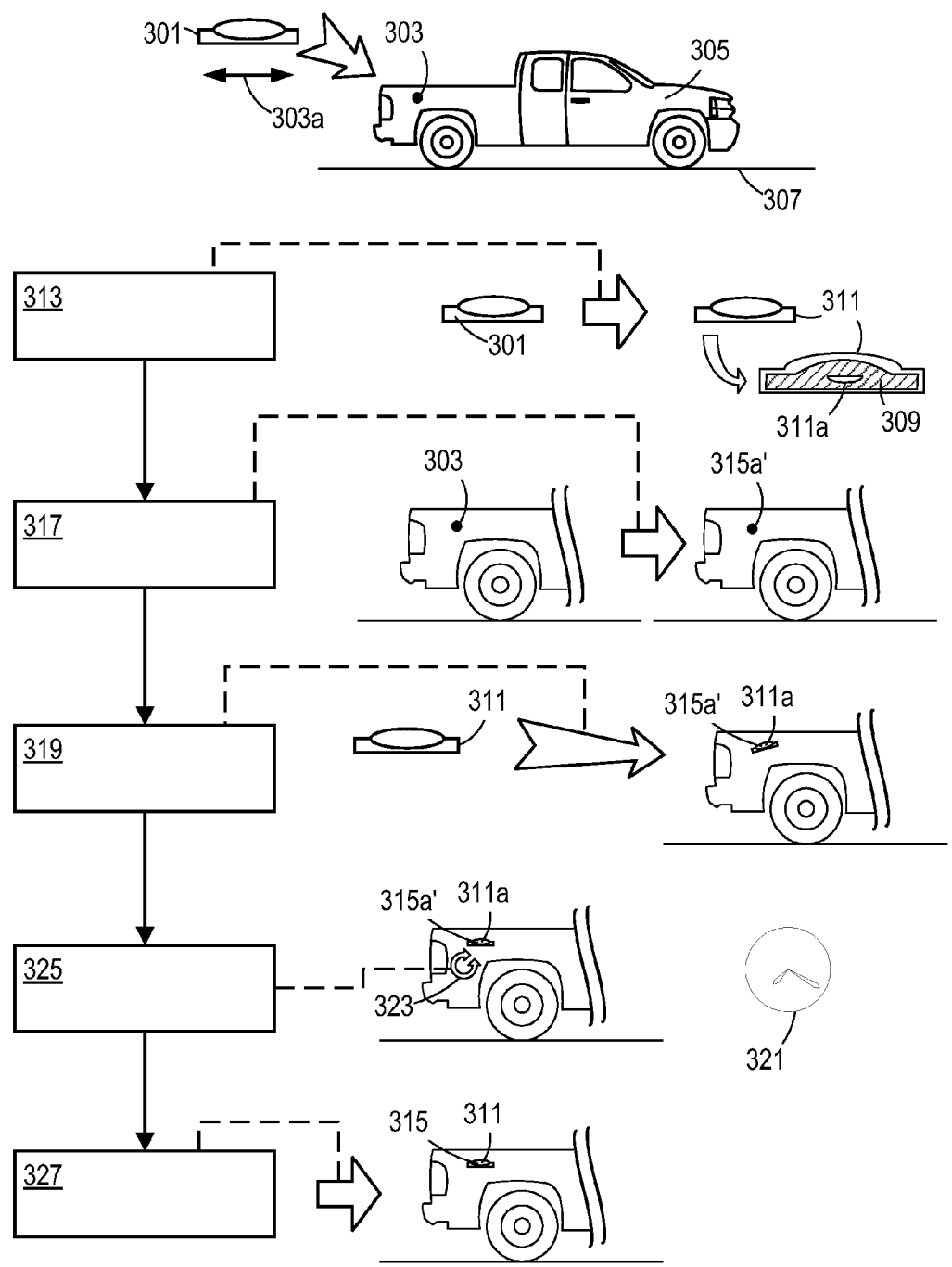
FIG. 3 illustrates a component assembly method according to still another embodiment of the invention.

FIG. 3 illustrates a component assembly method according to another embodiment of the invention, which provides an alignment for a component that is to be permanently fastened by an adhesive. In a non-limiting example of this embodiment, an emblem 301 is to be permanently fastened at a specific location 303 of a vehicle 305 being assembled on an assembly line 307. Emblem 301 is to be positioned at location 303 in an orientation 303a.

In a step 313 emblem 301 is provided with an integrated spatially-modulated magnetic array 311a, to result in a mountable emblem 311 having a spatially-modulated magnetic field. Also provided for mountable emblem 311 is an adhesive layer 309. In certain embodiments of the invention, adhesive layer 309 has a working time 321 before setting (or "curing"), which may vary according to the rates of one or more chemical reactions in adhesive layer 309, non-limiting examples of which include thermosetting resins. Mountable emblem 311 must be positioned and maintained in the desired alignment during the setting of adhesive layer 309. Once set, adhesive layer 309 provides permanent fastening of emblem 311 to vehicle 305 in the desired position and orientation.

In a step 317 location 303 of vehicle 305 is provided with an integrated spatially-modulated magnetic array 315a', which is complementary to spatially-modulated magnetic arrays 311a of mountable emblem 311.

In a step 319 mountable emblem 311 is placed on spatially-modulated magnetic array 315a' in a low-precision positioning operation. According to embodiments of the invention, a low-precision positioning operation can be performed manually by unskilled labor or by automated equipment with low-precision positioning capabilities. The precision required is only that which is sufficient to bring spatially-modulated magnetic arrays 311a of mountable emblem 311 into proximity with complementary spatially-modulated magnetic array 315a' to establish a higher-order mutual magnetic correspondence between them.

In a step 325, a low-precision torque 323 is applied to mountable emblem 311 to allow spatially-modulated magnetic array 311a to lock into the proper orientation with complementary spatially-modulated magnetic array 315a'. Torque 323 must be sufficient to overcome the viscosity of adhesive 309, but less than the torque necessary to overcome the higher-order mutual magnetic correspondence between spatially-modulated magnetic array 311a and complementary spatially-modulated magnetic array 315a' when they have locked into the correct orientation.

Steps 319 and 325 must be performed during the interval of working time 321.

In a step 327, mountable emblem 311 is left in position undisturbed for the remainder of working time 321. During working time 321, the higher-order mutual magnetic correspondence between spatially-modulated magnetic array 311a and complementary spatially-modulated magnetic array 315a' maintain the position and orientation of mountable emblem 311 with respect to vehicle 305 without the use of additional tools and fixtures. After working time 321 has elapsed, mountable emblem 311 is permanently held in position and orientation with respect to vehicle 305, without the need to remove any alignment fixtures.

In additional embodiments of the invention, adhesive layer 309 is composed of material applied to both emblem 301 and location 303. In one such embodiment, an epoxy resin is applied to emblem 301 and a corresponding hardener is applied to location 303. In this embodiment, the epoxy begins to set as soon as emblem 301 is placed onto location 303. In another such embodiment, adhesive layer 309 is composed of a contact cement applied to both emblem 301 and location 303. In this embodiment, the contact cement must be chosen to have a sufficient working time to allow for proper alignment and orientation before permanently setting. In yet another embodiment of the invention, the adhesive is injected at the interface between emblem 301 and the vehicle body at location 303 after alignment operation 325 is completed.

What is claimed is:

1. A method for aligning a first component relative to a second component in an assembly process, said method comprising:
   integrating one or more first spatially-modulated magnetic arrays (105a, 105b) into said first component (105);
   integrating a second spatially-modulated magnetic array (113a) into said second component (113), wherein said second spatially-modulated magnetic array (113a) is complementary to at least one of said first spatially-modulated magnetic arrays (105a);
   positioning said first component in magnetic proximity to said second component, whereby at least one of said first spatially-modulated magnetic arrays (105a) selects, when in magnetic proximity, said second spatially-modulated magnetic array (113a);
   wherein said at least one of said first spatially-modulated magnetic arrays (105a) and said selected second spatially-modulated magnetic array (113a) have a higher-order mutual magnetic correspondence therebetween, configured for self-orientating and alignment of said second spatially-modulated magnetic array (113a) with said at least one of said first spatially-modulated magnetic arrays (105a); and
   attaching said first component and said second component together with a permanent material fastener.

2. The method of claim 1, in case of integrating two or more said first spatially-modulated magnetic arrays (105a, 105b) into said first component (105), each of said first spatially-modulated magnetic arrays (105a) is different from another (105b) and wherein each of said first spatially-modulated magnetic arrays (105a, 105b) has its own said complementary second spatially-modulated magnetic array (113a, 117b), each of said complimentary second spatially-modulated magnetic arrays (113a, 117b) integrated into a different said second component (113, 117).

3. The method of claim 2, wherein placing of said first component (105) is in more than one collection, and is according to a predetermined priority for selecting and said aligning of said second component (113, 117).

4. The method of claim 1, wherein said permanent material fastener is a mechanical fastener.

5. The method of claim 1, wherein said permanent material fastener is said second component.

6. The method of claim 1, wherein said permanent material fastener is an adhesive, and wherein the method further comprises:
   applying said adhesive onto at least one of said first component and said second component; and
   wherein attaching said first component and said second component together includes setting said adhesive.

7. The method of claim 1, further comprising placing the first component and the second component within a mix of components in a container.

8. The method of claim 7, wherein positioning said first component in magnetic proximity to said second component includes stirring said mix of components to bring said first component within magnetic proximity to said second component.

9. A method for aligning a first component relative to a second component in an assembly process, said method comprising:
   integrating one or more first spatially-modulated magnetic arrays (105a, 105b) into said first component (105);
   integrating a second spatially-modulated magnetic array (113a) into said second component (113), wherein said second spatially-modulated magnetic array (113a) is complementary to at least one of said first spatially-modulated magnetic arrays (105a);
   placing said first component (105) in a collection containing at least said second component (113), thereby said at least one of said first spatially-modulated magnetic arrays (105a) is selecting, when in magnetic proximity, said second spatially-modulated magnetic array (113a);
   wherein said at least one of said first spatially-modulated magnetic arrays (105a) and said selected second spatially-modulated magnetic array (113a) have a higher-order mutual magnetic correspondence therebetween, configured for self-orientating and alignment of said second spatially-modulated magnetic array (113*a*) with said at least one of said first spatially-modulated magnetic arrays (105*a*); and providing at least one permanent material fastening means operative to hold said at least one first component and said second component relative to one another, according to said provided alignment;

wherein said permanent material fastening means is a third component having integrated there-into a third spatially-modulated magnetic array, said third spatially-modulated magnetic array is complementary to said at least one of said first spatially-modulated magnetic arrays (105*a*) or to said second spatially-modulated magnetic array (113*a*).

\* \* \* \* \*